(12) United States Patent
Ducato

(10) Patent No.: US 8,031,369 B2
(45) Date of Patent: Oct. 4, 2011

(54) METHOD, COMPUTER PROGRAM PRODUCT AND DEVICE FOR GENERATING AND PROCESSING DOCUMENT DATA WITH MEDIA-RELATED COLOR MANAGEMENT RESOURCES

(75) Inventor: José La Rosa Ducato, Erding (DE)

(73) Assignee: Oce Printing Systems GmbH, Poing (DE)

( * ) Notice: Subject to any disclaimer, the term of this patent is extended or adjusted under 35 U.S.C. 154(b) by 594 days.

(21) Appl. No.: 12/160,639

(22) PCT Filed: Jan. 10, 2007

(86) PCT No.: PCT/EP2007/050200
§ 371 (c)(1),
(2), (4) Date: Jul. 11, 2008

(87) PCT Pub. No.: WO2007/085524
PCT Pub. Date: Aug. 2, 2007

(65) Prior Publication Data
US 2010/0157329 A1 Jun. 24, 2010

(30) Foreign Application Priority Data
Jan. 20, 2006 (DE) .................. 10 2006 002 878

(51) Int. Cl.
*H04N 1/40* (2006.01)
(52) U.S. Cl. ........................................ 358/2.1; 358/468
(58) Field of Classification Search .................. 358/1.9, 358/2.1, 1.15–1.18, 500, 504, 468, 527, 518–520
See application file for complete search history.

(56) References Cited

U.S. PATENT DOCUMENTS

| 5,768,488 | A | 6/1998 | Stone et al. |
| 5,872,895 | A | 2/1999 | Zandee et al. |
| 5,982,997 | A | 11/1999 | Stone et al. |
| 6,097,498 | A | 8/2000 | Debry et al. |
| 6,327,624 | B1 | 12/2001 | Mathewson, II et al. |
| 6,654,143 | B1 * | 11/2003 | Dalal et al. ..................... 358/1.9 |
| 6,947,174 | B1 | 9/2005 | Chen et al. |
| 6,963,411 | B1 | 11/2005 | Billow et al. |

(Continued)

FOREIGN PATENT DOCUMENTS
EP 0 660 589 6/1995
(Continued)

OTHER PUBLICATIONS
Advanced Function Presentation—Programming Guide and Line Data Reference—Oct. 2000.

(Continued)

*Primary Examiner* — Thomas D Lee
*Assistant Examiner* — Stephen M Brinich
(74) *Attorney, Agent, or Firm* — Schiff Hardin LLP

(57) ABSTRACT

In a method or device to generate or process a resource-based document data stream with which an output of at least one document on an output medium can be controlled, the document data stream is provided with resource reference data related to at least one color management resource, and medium reference data related to the output medium. The resource reference data and the medium reference data are logically connected with one another such that when the medium reference data changes because the output medium has changed, then the resource reference data is automatically changed to another color management resource.

36 Claims, 5 Drawing Sheets

U.S. PATENT DOCUMENTS

| | | |
|---|---|---|
| 2002/0051180 A1 | 5/2002 | Shimbori et al. |
| 2002/0118380 A1 | 8/2002 | Krueger et al. |
| 2005/0024668 A1 | 2/2005 | Schmidt |
| 2005/0248787 A1 | 11/2005 | Aschenbrenner et al. |

FOREIGN PATENT DOCUMENTS

| | | |
|---|---|---|
| EP | 1 128 255 | 8/2001 |
| EP | 1 370 071 | 12/2003 |
| EP | 1 379 076 | 1/2004 |
| JP | 2002314830 A | 10/2002 |
| JP | 2003530636 A | 10/2003 |
| WO | WO 96/10239 | 4/1996 |
| WO | WO 03/069548 | 8/2003 |
| WO | WO 2004/008379 | 1/2004 |
| WO | WO 2004/013748 | 2/2004 |

OTHER PUBLICATIONS

Data Stream and Object Architectures—Mixed Object Document Content Architecture Reference Apr. 2001.

IBM Print Services Facility for OS/390 & z/OS Introduction Version 3, Release Mar. 30, 2002.

IBM Data Stream and Object Architectures—Image Object Content Architecture Reference Aug. 2002.

IBM Data Stream and Object Architectures—Intelligent Printer Data Stream Reference—Nov. 2002.

The World of Printers Edition 7, Nov. 2002.

* cited by examiner

METHOD, COMPUTER PROGRAM PRODUCT AND DEVICE FOR GENERATING AND PROCESSING DOCUMENT DATA WITH MEDIA-RELATED COLOR MANAGEMENT RESOURCES

BACKGROUND

The preferred embodiment concerns a method, a device system and a computer program for processing a resource-based document data stream. A typical document data format of this type is the AFP™ format (Advanced Function Presentation). It is used in particular in digital print production environments, i.e. in data processing and printing systems that process document data with high speed of up to a few thousand pages per minute, wherein the documents in particular respectively comprise document-specific data.

The preferred embodiment in particular concerns the generation and processing of resource-based document data streams that contain color-related data for the documents.

Details of the document data stream AFP™ are described in the publication Nr. F-544-3884-01, published by International Business Machines Corp. (IBM) with the title "AFP Programming Guide and Line Data Reference". The AFP document data stream was developed further into the MO:DCA™ document data stream which is described in, for example, the IBM publication SC31-6802-05 (April 2001) with the title "Mixed Object Document Content Architecture Reference". Details of this data stream are also described in U.S. Pat. No. 5,768,488. Specific field definitions of the data stream that contain control data (what are known as "structures fields") are also explained there.

In the course of print production jobs, AFP/MO:DCA data streams are frequently converted into Intelligent Printer Data Stream™ (IPDS™) data streams. Such a process is shown in U.S. Pat. No. 5,982,997. Details regarding IPDS data streams are described in the IBM document Nr. S544-3417-06, "Intelligent Printer Data Stream Reference", 7th Edition (November 2002), for example.

In the previously known AFP/IPDS architecture, the number of a feed tray ("Media Source ID" in the structured field "MMT") is indicated for selection of various recording media; see, for example, pages 231-242 in the aforementioned publication SC31-6802-05. A physical feed tray of a printing device is selected by a print application with this method, but the type of the medium to be printed (such as, for example, specific preprinted forms, transparent films, color paper etc.) that should be used for the application is not specified. Such established applications can only be used for a specific, indicated printing system and are dependent on setup settings of the printing device. The problem also thereby exists that such established applications do not produce the expected results when they are sent to a different printing system.

What are known as Map Media Type (MMT) structured fields are also provided in the AFP data stream (see publication Nr, SC31-6802-05 on pages 244-246). With them it is possible to specify the print media to be used in print applications, respectively identified by name or type designation. A control software to control a printing device then checks which feed tray in a printing device contains the desired recording medium and selects the first corresponding tray for printing.

Various additional print data streams and printing systems that are suitable for processing of the most varied print data streams (including AFP and IPDS) are described in the publication "Das Druckerbuch", Dr. Gerd Goldmann (Editor), Océ Printing Systems GmbH, 8th Edition (May 2004), ISBN 3-00-001019-x. The server system Océ PRISMAproduction is described in Chapter 14. This flexible print data server system is suitable, for example, to: receive print data—the print data being in a specific print data language such as AFP (Advanced Function Presentation), MO:DCA, PCL (Printer Command Language), PostScript, SPDS (Siemens Print Data Stream), in the Portable Document Format (PDF) developed by Adobe Systems Inc. or in the Line Coded Document Data Stream (LCDS) developed by the Xerox Corporation—from data sources such as a source computer; to convert the print data into a specific output format (for example into the Intelligent Printer Data format (IPDS)); and to transfer the data to a print production system in this uniform output format. Various technologies for color printing are described in Chapter 10, in particular the Océ Direct Imaging technology in Chapter 11 which enables a color printing based on 7 primary colors.

In the specification and further development of print data streams, the problem sometimes exists that new commands must be inserted into the data stream in order to take into account the further technical developments of computers, printing devices and/or post-processing devices. The determination of such extensions is for the most part a relatively complicated process in which various industry partners must cooperate in order to coordinate the changes or improvements among one another.

How three new data stream commands (namely WOCC, WOC and END) are added to the Intelligent Printer Data Stream™ (IPDS™) is described in U.S. Pat. No. 6,097,498.

A further possibility to store additional control data in an AFP data stream is to store data in what are known as object containers (see pages 93-95 in the publication Nr. SC31-6802-05, for example).

Additional techniques to insert new control information into AFP or IPDS data streams are described in WO 03/069548 (originating from the applicant).

A method to generate a document data stream that contains structured fields is known from U.S. Pat. No. 6,327,624 B1.

How document objects such as text, images, graphics, barcodes and fonts are handled in the AFP and IPDS data streams is described in the IBM publication SC31-6805-06 with the title "Image Object Architecture Reference", 6th Edition (August 2002). What is known as an Object Content Architecture (OCA) is defined for this in which specific data structures and control or object-identifying parameters are established for the respective objects, for example what is known as the Image Object Content Architecture (IOCA) for images, a corresponding GOCA for graphics, PTOCA for presentation texts etc. The IOCA is described in detail in the aforementioned document. Additional BM documents that are helpful in understanding the data streams are cited on pages v through vii of the document.

IPDS and AFP data streams normally contain and/or reference what are known as resources that contain data that are required to output the documents. The data of a resource can thereby be used repeatedly via simple referencing for one or more print jobs that in turn contain multiple documents or document parts, without having to be transferred repeatedly. The quantity of data to be transferred from one processing unit (for example a host computer generating the documents) to a subsequent processing unit (for example a print server or a printing device) is thereby reduced, in particular when data of a plurality of documents are to be transferred that possess or require the same data in part. Examples of such resources are character sets (fonts) or forms to be superimposed on documents (overlays). The resources can thereby be contained in the print data stream itself or be transferred separately from this between the involved systems and respectively only be referenced within various documents. It can thereby in particular be provided that the resources are already stored in the device (for example print server or printing device) conducting additional processing, such that they do not need to be retransferred with each print job but rather must merely be referenced.

Resources that originate at various points or from various sources in the AFP data stream are merged with the corresponding variable data given the presentation of AFP document data. The resource data can thereby be integrated into the document data stream as internal resources or can be called from libraries as external resources via a resource name. Furthermore, the data are checked for consistency in a parsing process.

Details such as how what is known as a Line Data or MO:DCA document data stream is converted into an IPDS data stream are described in the document "Print Services Facility for OS/390 & z/OS, Introduction", Vers. 3, Release 3.0, Nr. G544-5625-03 by IBM from March 2002. The software program Print Service Facility (PSF) thereby combines variable document data with resource data in order to administer and control output data that are sent to a printer as an output device. Software products under the trade names Océ SPS and Océ CIS that possess corresponding functions are developed and marketed by the assignee, Océ.

A method for secure administration and association of resources in the processing of resource-based print jobs is known from US 2005/0024668 A1. A method for processing of resource data in a document data stream is known from WO A1-2004/0008379.

In WO-A-WO 2004/013748 it is described how data related to reproduction media can be generated and processed in AFP/MO:DCA and IPDS data streams, and how media changes can be generated in these data streams for various documents or document pages, wherein in particular a hierarchical subdivision is provided in the data stream.

In principle the problem that the colors reproduced in an output device do not coincide with the original colors without further techniques occurs in the processing of color-related object data such as images, graphics and texts, for example. To process color data, what is known as color management technology was therefore developed that has as its goal the enabling of a reproduction of colors that is optimally true to the original. For example, color profiles of input and output devices that specify their properties in the processing of color data are defined for this. By taking the color profiles into account, color data can be converted in a processing chain so that the color object reproduced at the end of the chain coincides relatively precisely with the original object. Color data processing on the basis of color profiles is, however, relatively complicated in many cases.

What are known as highlight color (HLC) colors, methods and devices have also been developed for color information, in particular in the field of document data processing. Such colors comprise at least one color tone that normally lies apart from the color space of typical colorants. This color tone can, for example, be an application-specific color tone (for example for a color company logo, a decorative color or what is known as a "spot color") and/or be adapted such that it allows access to color tones that cannot be achieved with standard print colors such as, for example, yellow (Y), magenta (M), cyan (C) and black (K). The assignee Oce markets such highlight color toners for electrographic printers, for example, under the trade name Océ Custom Tone®. It is thereby in particular possible to provide printing materials (toner) specific to the customer in special colors that are unique in their specification and are used only by this customer because they exhibit a color individually determined by the customer, for example, which color identifies that customer. Such color printing materials are used for printing of company logos in a specific "company color", for example.

A standard color and an HLC color can also be printed at different brightness levels or color saturation levels in highlight color printing. The standard color is normally black and is printed in different grey levels.

A method with which what are known as color management resources (CMR) are used to describe color properties of objects of a document is known from US 2005/0248787 A1, which color management resources are used in the processing of document data in order to match color-related specifications in the output.

Additional concepts for processing of resource-based print data streams are contained in the patent application filed on the same day by the applicant with the title "Verfahren, Computerprogrammprodukt und Vorrichtung zur Erzeugung und Verarbeitung von Dokumentendaten mit indizierten Farbmanagementressourcen".

Printing processes are increasingly more comprehensive since ever more devices are integrated into a printing process, whereby the functional diversity increases. Printing processes are additionally increasingly executed distributed over a region via internet and intranet or are associated with a pool of printers that can be regionally distributed. Moreover, devices of different manufacturers must increasingly cooperate in a process. In order to be able to meet these rising demands, what are known as job ticket data are provided that are exchanged (in particular in a file separate from the rest of the document data stream) between two or more software and/or hardware systems as job chaperone data regarding a document data stream. A uniform specification for exchange of data formats in a printing process that is designated as a job definition format (JDF) was agreed upon in an industry consortium. There is a corresponding job messaging format (or JMF) for this that is correspondingly specified. The specification of JDF can be downloaded from the Internet site www.cip4.org; at the point in time of the present patent application the current specification is JDF Specification Release 1.3.

There are additional standardization bodies in the field of document management and in particular printing, for example the Printer Working Group (PWG), which in particular has developed the Internet Printing Protocol (IPP) (see http://www.pwg.org/ipp) or the consortium for the Universal Printer, Pre- and Postprocessing (UP$^3$I) Interface, which concerns the exchange of control data between printing devices and pre- and postprocessing devices belonging to these printing devices (see http://up3i.org/). In particular the document "Standard for Media Standardized Names" (26 Feb. 2002) was formed with regard to IPP. This and additional documents are in particular available from the respective Internet presences of the standardized bodies.

The aforementioned publications or documents are herewith incorporated by reference into the present specification, and the methods, systems and techniques described there can be applied in connection with the present preferred embodiment.

SUMMARY

It is an object to improve the processing of color information in a resource-based document data stream.

In a method or device to generate or process a resource-based document data stream with which an output of at least one document on an output medium can be controlled, the document data stream is provided with resource reference data related to of least one color management resource, and medium reference data related to the output medium. The resource reference data and the medium reference data are logically connected with one another such that when the medium reference data changes because the output medium has changed, then the resource reference data is automatically changed to another color management resource.

DESCRIPTION OF THE PREFERRED EMBODIMENTS

Figure 1:
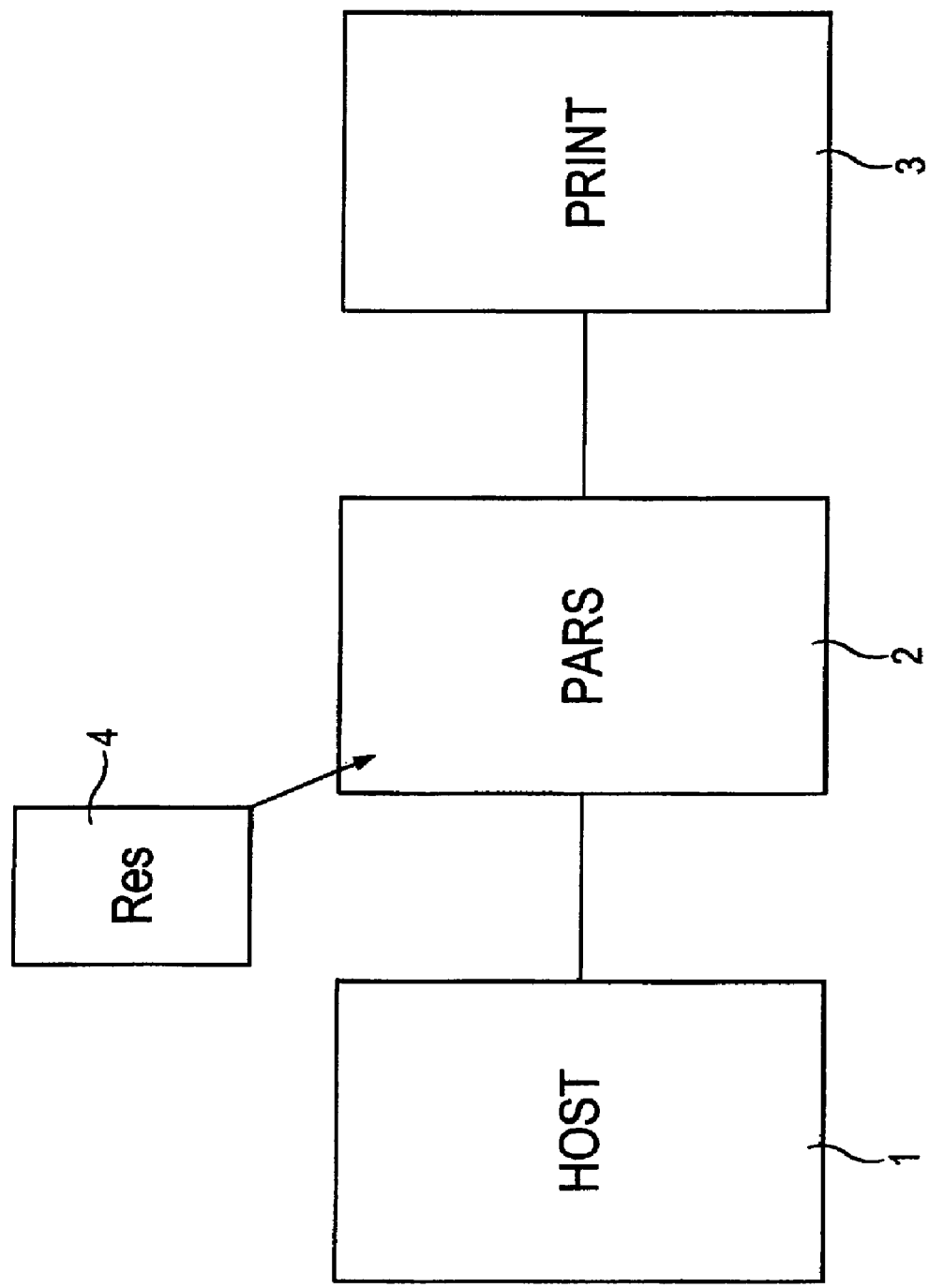
FIG. 1 illustrates a document production system.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

According to a first aspect of the preferred embodiment, in the generation of a resource-based document data stream with which the output of at least one document on an output medium (in particular on a recording medium) can be controlled, wherein the document data stream contains resource reference data related to at least one color management resource medical reference data related to the output medium, the resource reference data and the medium reference data are logically linked with one another. Given a change of a reference to an output medium within the document data stream (in particular in a later, automated processing of the document data stream), a change of the reference to a color management resource can automatically occur via this link or, respectively, association.

This aspect of the preferred embodiment is based on the realization that the color impression of color components in the reproduction of a document on various recording media is different depending on the recording medium. It is furthermore based on the realization that, given the reproduction of the color components on an output medium that is a recording medium, its properties with regard to color, weight and/or surface influence the impression or the values of the ultimately reproduced colors. In a preferred exemplary embodiment to process color-related data of document data streams that are provided on a specific output medium, a color management resource that is in particular individually associated with the output medium is correspondingly provided that contains data adapted to the corresponding properties of the output medium.

Furthermore, according to the preferred embodiment it was realized that, based on the resource model for document data streams, the association of an output medium with document ranges (in particular one or more document pages) that should be output on the same output medium, the size of the document data stream can be minimized in that, within the document data stream, the corresponding medium is selected at corresponding, document-related points only with reference data, and the corresponding detailed control data with regard to the medium (here in particular color management resources) can be linked with the medium via index-like resource reference data or can be used to control the output in later processing or reproduction of the data. This is achieved in particular in that resource reference data related to a color management resource and the medium reference data within the document data stream are logically connected with one another or are permanently associated with one another, in particular with regard to a data stream of associated document data.

The preferred embodiment enables the allocation of a color management resource to a recording medium together with other allocations regarding the recording medium to be made once, and to be adopted in the document data stream at multiple document points via simple referencing or, association of the recording medium with all allocations associated with it, including the associated color management resource. Corresponding systems for generation and processing of the document data streams are therefore quite user-friendly. Furthermore, errors in the generation and processing of corresponding document data streams can thereby be avoided because the use of color transformation tables or color management resources in the processing of the image data automatically occurs with the assigned color management resource (and therefore reliably) in the printout of data streams whose documents should be output on various recording media and contain color data. Errors due to incorrect or missing association of suitable color management resources in single or multiple document pages (that in particular can arise given multiple changes of the recording medium association within a document data stream) can thereby be largely avoided with this.

The association of resource reference data and recording medium reference data can be retained or also modified within the document data stream that comprises data regarding multiple documents, within document pages and/or within document page ranges that can comprise successive pages.

The association of a color management resource with a recording medium can in particular occur via referencing of the color management resource within a data element associated with the recording medium, for example in an MO:DCA Medium Map in a Medium Modification Control Field. The association of a color management resource with a document page or a group of document pages can then simply occur via association of the recording medium with the document page or the group of document pages, wherein the CMR association is automatically provided via the references in the data element associated with the recording media.

A logical link or reference already existing in the data stream can correspondingly be used to control the color output elements in the processing and in particular output of the document data stream in an output device.

The association of attributes related to color management resources, page-related attributes and/or media-related attributes within the document data stream can in particular occur hierarchically according to document regions. An adjustment related to a color management resource can thereby in particular occur to the value of a superordinate hierarchy level when a hierarchy level is ended.

Successive document pages are in particular processed with the same associated media until new media are associated. If one medium is associated with a region of the document data stream but no color attribute is associated, valid color attributes for a superordinate region can be associated with this region in the processing of the document data stream, in particular in the course of outputting the document data on a recording medium. According to this preferred exemplary embodiment of the invention, in particular a change of various recording media in the output of documents on various recording media (for example page-shaped recording media) available in a printing device can be output with only a few control data (and therefore high speed). For example, if a plurality of pages are output on white standard paper sheets for which the standard color management resources of the printing device are used and a different medium (for example paper sheets with higher weight and/or different color that serve as divider sheets) is associated with only a few specific pages of the document, the media data associated with the divider sheet regions can be processed without separate reference to a color management resource in which the superordinate color management resources (associated in particular with the entire print job) for the remaining pages are used.

The levels "Entire data stream" (corresponding, for example, to a print file or a print job), "Document", "Page group" and/or "Data object" can be provided as additional hierarchy levels of the document data stream.

According to a further preferred exemplary embodiment of the invention, the data of a color management resource can comprise encoded, stored values of media properties, in particular regarding media brightness, media color, media surface (English: media finish) and/or media weight of the associated recording medium.

In the output of the documents in an output device (such as, for example, a printing device), it can then in particular be checked whether an available output medium corresponding to the medium reference data corresponds to the media properties stored in the color management resource, and in the case of a lack of correlation, it is in particular checked hierarchy level by hierarchy level whether a color management resource better corresponding to the media properties of the output medium is available, and if applicable this is used for processing of the associated document data. Alternatively or additionally, a corresponding instruction and/or a corresponding selection menu can be output via a device control panel (for example a graphical user interface (GUI)) to establish the mode of operation.

Furthermore, a check with regard to the media properties (in particular media brightness, media weight, media finish and/or media color) can occur to establish suitable color management resources in the printing device, and a suitable decision can be made depending on the correlation between media selected in the document data stream and media available in the printing device.

In a preferred exemplary embodiment of the invention, files of color management resources are provided with names from which at least one attribute of the media associated with them arises. It can thereby in particular be provided to incorporate or to use a standardized name of a medium, for example a name standardized in the aforementioned IPP document "Standard for Media Standardized Names". The administration of corresponding color management resources can thereby be simplified for operators of corresponding computer systems in which the color management resource names are presented in corresponding plain text.

Given the processing of document pages that are provided for double-sided output on a recording medium, according to an advantageous exemplary embodiment of the invention an identifier can be provided to differentiate the front side and the back side, via which identifier a different color management resource is associated with the front side than with the back side. In particular it is thereby possible to enable a color-accurate reproduction on recording media whose media attributes are different on the front side and the back side, in particular with regard to the color and the media surface.

The preferred embodiment is in particular provided for application to document data streams that are structured and in particular encoded according to the AFP, MO:DCA and/or IPDS formats. In particular it is thereby provided to provide the association of the color management resource with an output medium with a structure element associated with what is known as a medium map, in particular with a Media Map Object. Furthermore, the association can in particular occur by means of a structured field, furthermore, in particular in a MO:DCA data stream via what is known as a Medium Modification Control (MMC) field. The structured field can in particular comprise data that are associated with a name of the color management resource; the encoding employed in the structured field; an identification number; and/or a specification with regard to the color management resource.

The association of the color management resource with an output medium can furthermore in particular occur via an identification marker of the color management resource. In addition to the color management resources, the document data stream can comprise further resource associations corresponding to the respective document data stream and conforming to specification, for example fonts, overlays etc. for AFP, MO:DCA or IPDS data streams.

According to another advantageous exemplary embodiment of the invention, further information about desired, color-specific further-processing parameters can be stored in a document data stream for an output medium, in particular to establish color transformation properties for cases in which colors that cannot be reproduced in an output device with the means located therein (in particular printing materials or printing methods) are referenced in the document data. These determinations can in particular occur corresponding to a known rendering intent association concept and comprise the variants "calorimetric" and "medium-absolute", wherein for example "calorimetric" applies to a calorimetrically color-neutral reproduction of the documents with the employed output printing materials and "medium-absolute" applies to a medium-specific (in principle freely selectable) reproduction characteristic. Further variants such as, for example, "saturation" and "photometric" can additionally be provided.

According to a second aspect of the preferred embodiment that can be executed in connection with or also independent of the aforementioned aspects of the preferred embodiment, for generation and/or processing of a document data stream that comprises data related to color management resources, with which data the processing of color-related data of the document data stream can be controlled, at least one indexed color management resource is associated with the document data stream, with which indexed color management resource color-related data of the document data stream can be associated with at least one predetermined color palette.

The second aspect of the preferred embodiment is based on the realization that the handling of color-related data can be significantly simplified when the basis on which the color data are related or the available color space linked with this is limited.

This second aspect of the preferred embodiment is furthermore based on the realization that, in the generation and/or processing of document data, the graphical reproduction of the color objects contained in the documents is already limited by the output devices thereby used due to the device-specific color characteristics such as, for example, the printing colorants available in a printing device.

Furthermore, it was realized that the cited limitations for the transfer of document data that define color information on the basis of color management resources, via reference to predetermined color palettes both a very precise, device-spanning color association and a high-performance processing of the color data are possible because both the color coding with only a few data sets and the color data processing are to be accomplished with small effort. With the preferred embodiment, the advantage can in particular be achieved that elaborate color data transformations are not required because the predetermined color palettes are known and have in particular already been adjusted in advance across systems, from the system that generates the document data to the output system that outputs the document data (for example in a printing device).

Via the reference of the document data to an indexed color management resource it is thereby possible to address color information via a short index code comprising, for example, only a few bytes. Based on the indexed color management resource which contains more precise information about the color data associated with this code, a reduction of the data stream volume is possible, in particular in the transfer of the document data stream, because special color tones (such as, for example, highlight colors) can be directly addressed with the index value. The indexed color management resource can in particular contain data that contain information about a color space associated with the index code, such as for example red-green-blue (RGB), cyan-magenta-yellow-black (CMYK), grey tones or mixtures of individual color tones (what are known as colorants). The indexed color management resource can identify the individual color tones or colorants, in particular via a plain text name.

The colors defined with the index code can correspond to one or more color tones and/or colorants or also to a combination of one or more of these color tones. To process the document data it has in particular proven sufficient to define a limited number of colors (for example 64,000 colors) as a color palette. The specification of the colors in detail can thereby in particular occur individually according to application. However, it in particular applies across processes from the generation of a document up to its output at an output device. The specification for a color palette can, however, also apply across applications, wherein it is even conceivable that specific color palettes with their associated color tones are standardized or determined in a color definition system.

A color palette can in particular be encoded with relatively short codes, for example with two-byte codes for 64,000 colors. It is thereby possible to sub-divide the available colors into various palettes, wherein (for example) 264 palettes are encoded with a first byte and 264 colors per palette are encoded with a second byte.

According to a third aspect of the preferred embodiment that likewise can be viewed independently or in combination with the aforementioned aspects of the preferred embodiment, to transfer color information of an object into a resource-structured document data stream the color information is transferred via an index value that corresponds to an entry in an indexed color management resource.

The index value is thereby a relatively simple, short numerical code that corresponds to a limited number of available colors and comprises only a few bytes (for example one to four). Within the color management resource, the numerical code is in particular associated with a color model and/or a color. The color management resource can in particular be generated independent of the document data stream and/or be exchanged between a system sending the document data and the system receiving the document data. Generation, exchange and storage of the color management resource can thereby in particular occur according to the methods typical for resources in the print data streams AFP and IPDS. The methods, measures and system structures specified in US 2005/0248787A1 in connection with color management resources can also be advantageously used in connection with the present preferred embodiment. For this, the document is again incorporated by reference into the present specification at this point.

According to both latter cited aspects of the preferred embodiment, encoded reference information that specifies which primary color tones or primary color tone components should be used in the output of the data can thus already be generated across processes in the generation of documents. The primary color tones can already be selected or determined in advance corresponding to the primary colors available in an output device. They and/or the color system formed by them are moreover freely selectable, i.e. not unconditionally bound to existing color systems such as RGB or YMCK, for example. Various references can thereby occur per object within a data stream or even documents, for example a first object according to a first color system (for example RGB) and a second object according to a second color system that is independent of the first. It is thereby in particular enabled to reference an output device-specific color system in the document data stream via an index (i.e. directly with only a few items of control data). The color system is thereby in particular defined specific to the device via device-specific color tones such as, for example, highlight colors or Custom Tone® colors that are not primary colors of a conventional color system.

To generate an indexed color management resource, it is in particular advantageous to have available or to store in a table the color tones and/or printing materials available in an output device (such as, for example, a printer) as well as their properties (such as, for example, colorimetric color values). These can then be considered in the creation of the indexed color management resource and in particular also incorporated into the color management resource. For a largely automated creation of indexed color management resources it is advantageous when the output devices automatically report these values to a control system that controls the generation of the color management resource. This can occur in a print production environment, for example via a data network as well as a print server.

According to an advantageous exemplary embodiment of the invention, the indexed color management resource contains coded information (for example in a header region (header section) that is associated with the number of the process color palettes available in the indexed color management resource.

In an additional advantageous exemplary embodiment of the invention, the indexed color management resource contains coded information per process color palette, which coded information indicates which color tones available in the output system and/or defined in a color system (such as RGB or YMCK, for example) are available to reproduce the process colors of the respective process color palettes.

The described concept for color management resources achieves for creators of documents a flexible, device-independent system because it opens up possibilities of document design from printing in greyscale to full-color applications with a plurality of different primary colors. Additional functionalities of highlight color or "spot color" in Postscript/PDF containers can be integrated into the proposed environment.

Further details of the last two cited aspects of the preferred embodiment are contained in the aforementioned patent application filed on the same day by the applicant with the title "Verfahren, Computerprogrammprodukt und Vorrichtung zur Erzeugung und Verarbeitung von Dokumentendaten mit indizierten Farbmanagementressourcen", which is again incorporated by reference into the present specification at this point for this purpose.

According to a further advantageous exemplary embodiment of the invention, data about the color management resources are integrated into a print job chaperone file (that is in particular formed according to the JDF standard), and the print job chaperone file is exchanged between two data processing systems participating in the processing of the print data. The data about the color management resources can thereby be very different with regard to their scope, depending on the requirements that are posed for processing of the print data and the conditions such as, for example, the availability of the color management resources in a downstream data processing system. For example, they can range from simple information comprising 1 bit that indicates whether the print job should be processed with color management resources to the referencing of color management resources or types of color management resources to the concrete data of the color management resource as such.

A document generation and printing system that comprises a host computer 1, a print server 2 and a high-capacity printer 3 is shown in FIG. 1. Generated in the host computer 1 are, on the one hand, variable print data (for example from a database) and, on the other hand, a pagedef file and a formdef file comprising resources, from which an Advanced Function Presentation data stream is formed. The document data stream so generated is supplied to the print server 2 in which the document data stream is prepared and converted into an Intelligent Printer Data Stream (IPDS) for output to the printing device 3. For this, multiple processes that are controlled by software modules run on the print server 2. A first software module incorporates into these processes additional resource data 4 (such as fonts or overlays, for example) that are called in the original document data stream. A second software module, the parsing module, checks the document data stream for consistency with predetermined rules. Upstream of the parsing process is a pre-parsing process that is implemented by a corresponding software module in which an identification datum is associated with each resource call and the associated resource file in addition to the resource name, via which identification file the resource is uniquely identified relative to all other resources of the document data stream. Within the document data stream, the resource can then be called once or multiple times by means of the resource name and/or the identification datum to show the document data and the resource data on the printing device 3. The processes shown here in the print server can also be implemented partially or wholly in a controller of the printing device. The IPDS data stream is rastered and the documents are printed out in the printing device.

In the shown exemplary embodiment, the AFP document data stream contains documents that correspond to the MO:DCA standard and respectively contain reference data for data objects that are available through the print server 2. The resource data 4 can thereby be transferred from the host computer 1 to the print server 2 separately from the MO:DCA document data stream or already be stored in the print server 2 as external resources. The resource data can, however, also be transferred together with the document data stream from the host computer 1 to the print server 2 as embedded resource data (what are known as inline resources). Further details of a corresponding data processing are described in WO-A1-2004/0008379, which for this is incorporated by reference at this point of the specification. The resource data can contain what are known as data object resources that contain object data which are in particular repeatedly referenced in an identical manner in a document data stream. Such data objects can contain image data, text data and/or graphic data, for example. The reference to the object resources can occur via an object resource library that contains characterizing data regarding the object as well as data about the storage location of the corresponding object data. The library comprises a data object resource access table (RAT) that, for the print server 2, acts as an index table for the access by the print server to the resource data.

The print server 2 receives the MO:DCA document data stream from the host computer 1, converts it into an IPDS document data stream and sends this to the printing device 3. In the course of the data conversion, said print server 2 reads the reference information (name) of a data object from the MO:DCA document data stream and accesses the stored data resource with the aid of the data object resource access table (RAT). The complete data of the object are then integrated into an IPDS data stream and send to the printing device 3. This method can be applied just as well when the data are sent to a different output device (for example to a color monitor) instead of to a printing device.

An MO:DCA document data stream is structured in data elements that are largely self-explanatory. Structured fields are important components of the MO:DCA structure. A structured field is sub-divided into multiple parts. A first part (introducer) identifies the desired command, indicates the total length of the command and specifies additional control information (for example whether additional filler bytes (what are known as padding bytes) are present. The data contained in a structured field can be coded as fixed parameters, contain repetition information (repeating groups), keywords and what are known as triplets. The fixed parameters deploy their effect only for the structure in which they are contained. Repeating groups specify a grouping of parameters that can occur multiple times. Keywords are self-explanatory parameters that typically comprise two bytes, wherein the first byte is an identification byte for the keyword and the second byte is a characteristic data value for the keyword. Triplets are self-explanatory parameters that contain a length specification in a first byte, a characteristic identification information for the triplet in a second byte and up to 252 data bytes. The cited data streams of a MO:DCA document data stream define a syntax that can be evaluated in the course of a parsing process and can be flexibly expanded.

MO:DCA data streams are furthermore hierarchically subdivided, wherein information that concerns the entire data stream (print file component) are contained in the topmost hierarchy level. Defined in the next hierarchy level are documents which are broken down per hierarchy level into page ranges (Engl. page groups) comprising multiple pages; pages; and page elements which can in turn break down into sub-hierarchies. The page elements are thereby in particular objects which represent the lowest hierarchy level. Object components can be graphics, images, presentation text or barcodes, for example.

Each hierarchy level of the MO:DCA document data stream can be defined by a pair of structured fields of a start-structured field and an end-structured field. It is thereby in particular possible that a processor that processes the data can ignore an element that it cannot process. Examples of such beginning-end pairs are the pairs "Begin Document" (BDT) and "End Document" (EDT) or "Begin Page" (BPG) and "End Page" (EPG).

Corresponding pairs of structured fields—namely the structured field "Begin Resource" (BRS) and "End Resource" (ERS)—are also provided for document objects that are referenced via a resource. Additional resource objects can be referenced within a resource object.

Color management resources (CMR) for processing of color-related information regarding document objects have been proposed in US 2005/0248787 A1. Various types of color management resources are reasonably provided: a color conversion color management resource (Color Conversion CMR) that defines a device-dependent color, for example a color that is defined by an input device such as, for example, a scanner or by a reproduced color of an output device such as, for example, a printing device. The color is thereby presented on the basis of a device-independent color space such as, for example, the CIELAB color space. A color management resource can thereby contain data of an ICC color profile, for example.

An additional color management resource is the linked color conversion color management resource (Link Color Conversion CMR). With, it a color transformation for a color object can be defined that: was generated or acquired with a first device; has a device-specific color characteristic; and is output with a second device that has a different device-dependent color characteristic relative to the first device. With a link color conversion CMR, the conversion of the data of an object that is defined in the RGB color space can then occur directly into data (for example) that are output at a printing device that operates on the basis of the CMYK color space. The RGB document data can thereby be converted directly into the CMYK space with a corresponding conversion table (look-up table). The look-up table thereby furthermore enables color characteristics—in particular the ICC profiles of both devices for generation of the RGB image data (for example a camera) and of the output device (for example printing device) to be directly incorporated, such that the color transformation both between the two color spaces and under consideration of the two device-specific color profiles in a processing step can occur in one processing step using the look-up table.

An additional CMR type is a half tone image color management resource (Half Tone Screen CMR). How digitized color tone values of a color are transformed into the digitized values of a color that comprises fewer bits is defined with such a CMR; for example, a conversion from one color that is described in eight bits into a color that is described with less than eight bits can occur with this. The appearance of a color document in the output can therefore be modified or adapted.

What are known as calibration curve color management resources (calibration curve CMR) define information with which control parameters for an output color can be modified; for example, the brightness and/or the saturation of the output components can therefore be altered.

Multiple color management resources can be associated with a document object or multiple references to this document object can occur in color management resources; for example, an operation with a calibration curve color management resource can initially be applied for a document object, and after this a measure according to a half tone screen color management resource.

Color management resources can be handled as object container resources, in particular in IPDS document data streams.

Figure 2:
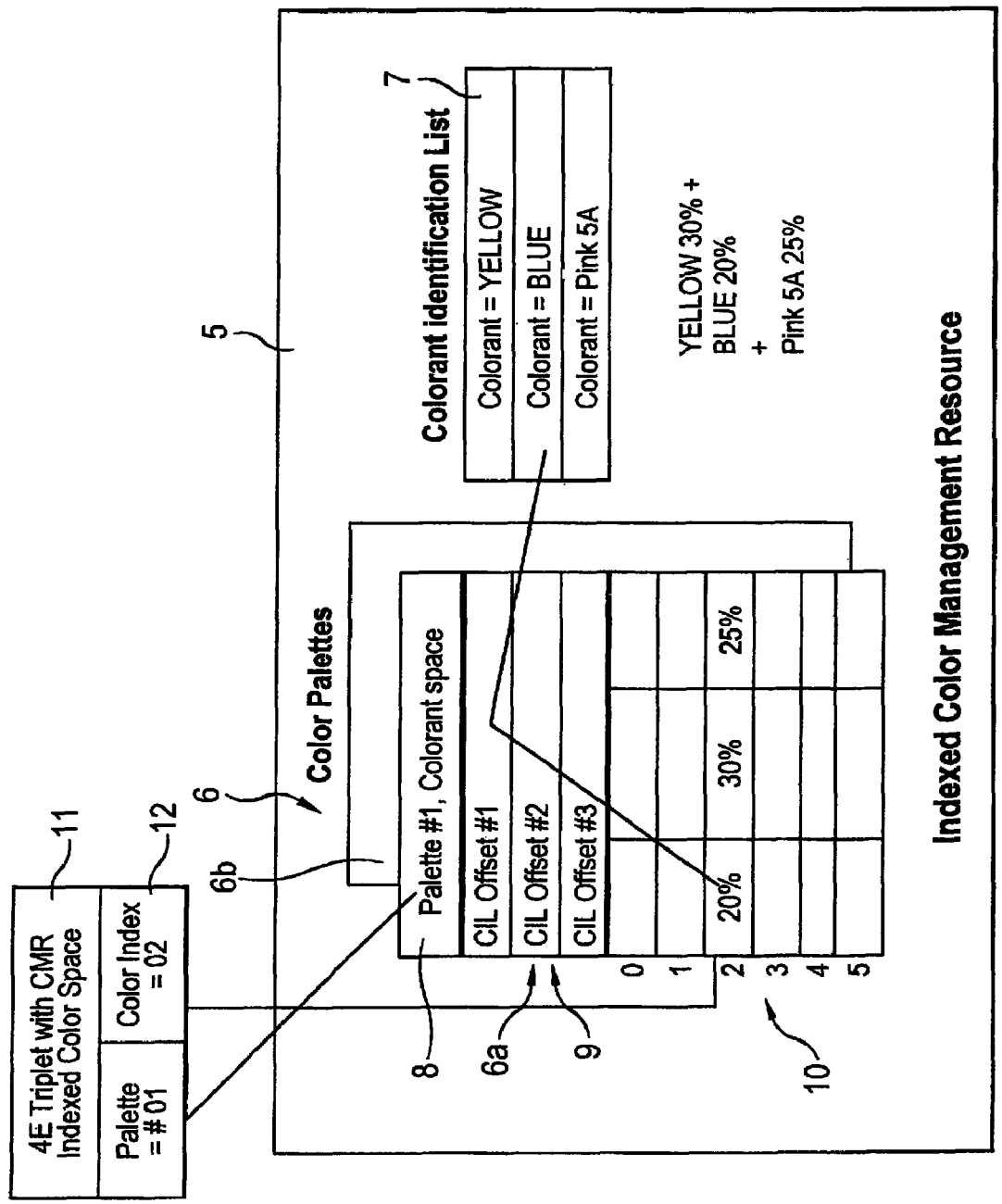
FIG. 2 shows an example for an indexed color management resource.

An example of how an indexed color or color management resource can be controlled or the color control data stored there can be retrieved with a "4E" triplet of an MO:DCA data stream is shown in FIG. 2.

For this an indexed color management resource 5 contains color palette data 6 and data regarding individual color tones or printing colorants (which can comprise of toner or ink, for example, which data are stored in a color tone identification list 7.

In this example the color palette data are divided up into a first color palette 6a and a second color palette 6b; however, instead of this they can also be integrated into a corresponding larger single color palette. The color tone identification list 7 is associated with the color palettes 6a or 6b. For this the data of the identification list contain characteristics of the individual color tones that are associated with corresponding association data in a color tone information region 9 of the color palette 6a. Header information 8 is provided to identify the color palette 6a. For the indexed color values with regard to the three color tones or their associated color printing materials yellow, blue and pink 5a that are listed in the color tone identification list 7, respective values that correspond to corresponding proportions of these three color tones for reproduction of the indexed color value are stored in a data region 10 of the color palette 6a. A "4E" triplet stored in the MO:DCA data stream, which "4E" triplet references the index color management resource 5, contains referencing data 12 with which the color values stored in the color management resource 5 can be retrieved. In the shown example, the referencing datum comprised of a first byte that corresponds to the palette number #01 and a second byte #02 that references the color indexed in the palette. The index color number 2 referenced in the shown example is comprised of a mixture of the individual color tones (or color printing materials) yellow at 20%, blue at 20% and pink 5a at 25%.

Figure 3:
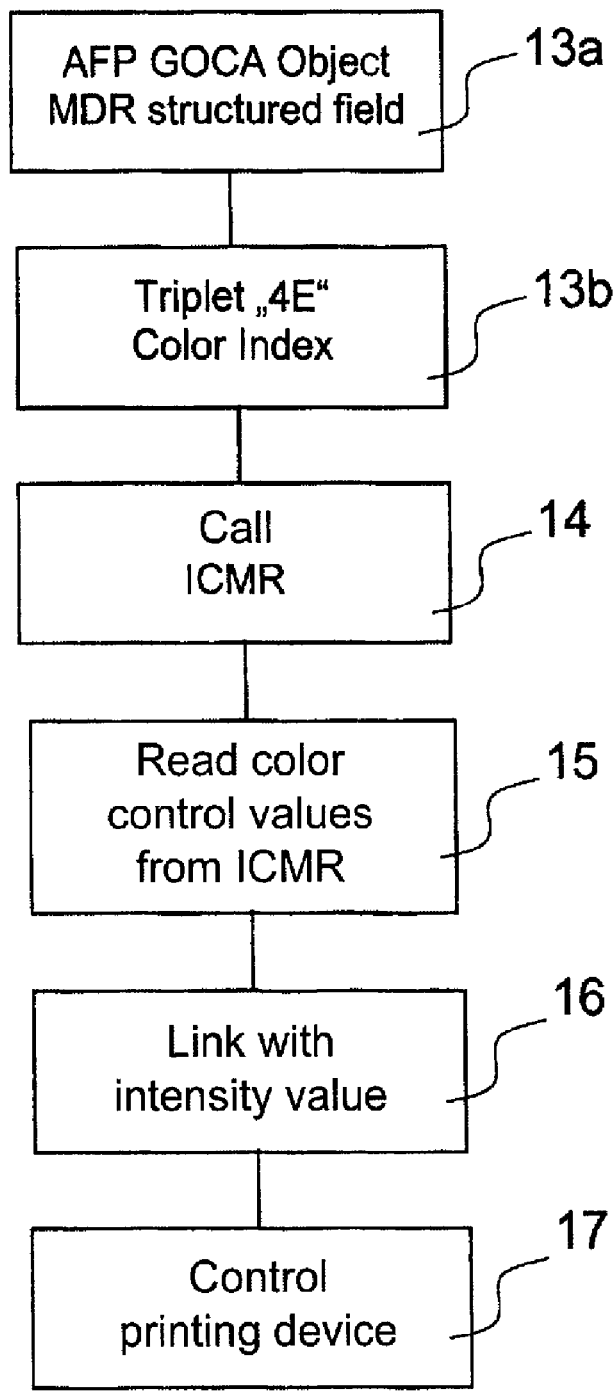
FIG. 3 shows a method workflow for association of colors in a print job.

Illustrated in FIG. 3 is a method with which a color association can occur on the basis of indexed color management resources in a GOCA object 13a of a MO:DCA application. The structured field MDR thereby contains in the OEG of this object container a reference information regarding the indexed color management resource 14. Furthermore, a color index is referenced in the "4E" triplet 13b. Upon interpretation (parsing) of the data stream in the print server 2, based on this reference value the corresponding indexed color management resource is called in Step 14 and the corresponding color control values for the corresponding color tones are read out from the index color management resource in Step 15. The cited step can also occur at the printing device as an alternative to the print server. The values read from the indexed color management resource are additionally overlaid with intensity values before the output of the data stream at the printing device, which intensity values are assigned (Step 16) to the corresponding pixels and correspondingly control the corresponding color printing station of the printing device in Step 17.

Figure 4:
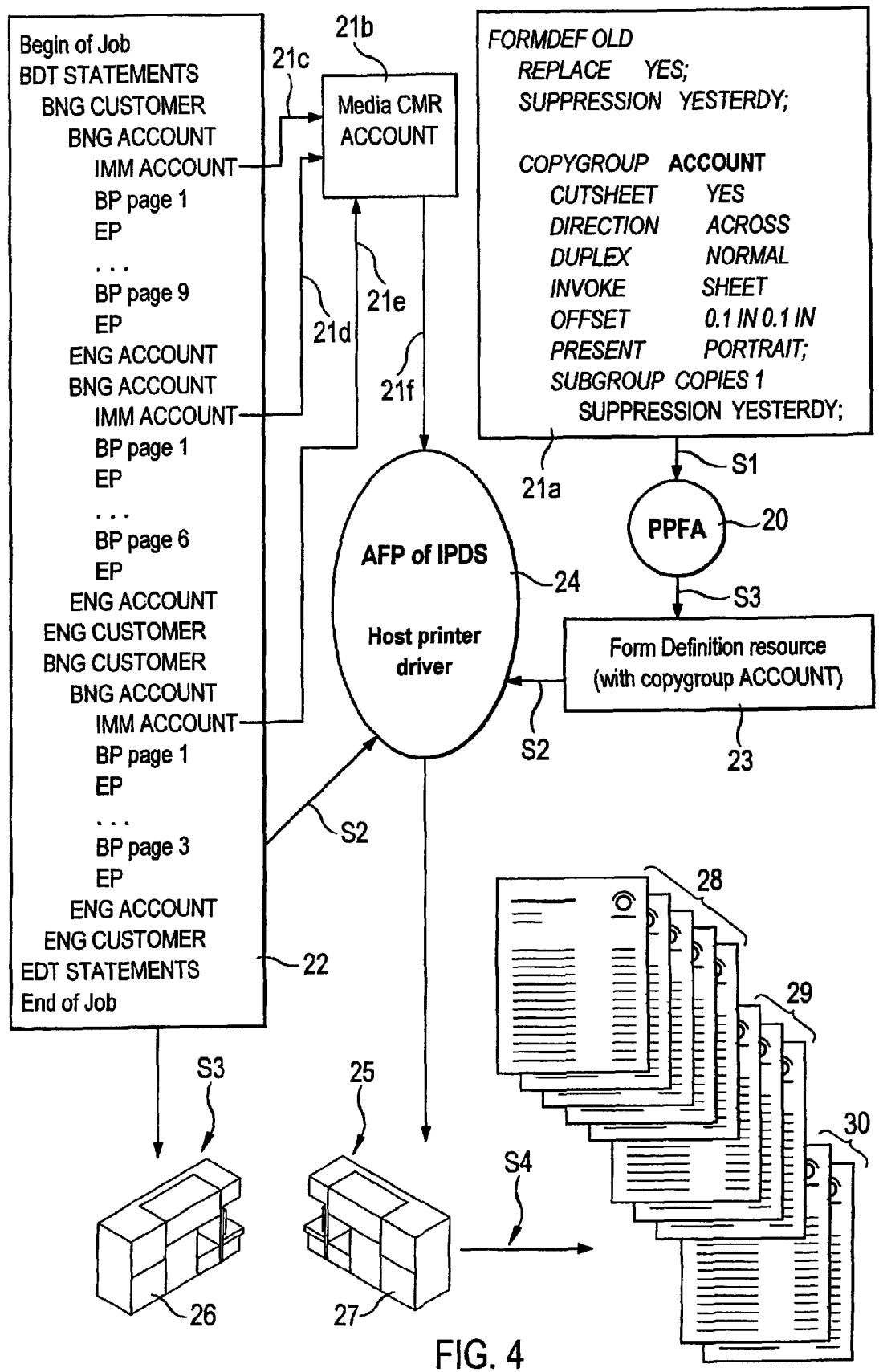
FIG. 4 illustrates the processing of an MO:DCA data stream.

Structure elements—what are known as output device facilities (Screen Device Facilities, SDF)—are provided in AFP, MO:DCA and IPDS data streams, with which structure elements output device-specific settings or specifications can be transferred or effected. An example is shown in FIG. 4 of how corresponding transfer fields for these data streams can be provided with which properties of output devices (in particular their ability to output color information) can be presented. The corresponding data structure field for such an SDF and its properties (number of bytes, name, scope of validity of the values (range) and data meaning (meaning)) are shown in Table 17a. Examples for corresponding additional data values of the SDF field are specified in Tables 18, 19, 20 and 21, namely data regarding general properties of the output device (in particular printing device) in Table 18, data for a device that can only be reproduced in black-and-white in Table 19, data for a device that can reproduce at least one highlight color in Table 20, and in Table 21 contains information that characterize an output device that can reproduce the full color data.

For output devices (for example printing device), color specification data can be recorded once for the device and be used as long as the corresponding characteristics of the output device do not change. The data can be stored in the printing device itself, in a mobile data medium (such as, for example, a CD-ROM), in a print server or in a user computer, including a host computer that generates document data. The corresponding data can naturally also be transferred via data networks such as intranets or the internet. These data can be used just as well as the subsequently cited data characterizing color properties of a printing device in detail in order to generate color management resources (in particular indexed color management resources). The color management resources can thereby in particular be stored in resource libraries. This can occur according to the method cited in US 2005/0248787 A1, for example, and with the components of a color management resource installation system (CMR Installer, reference number 301), a Color Engine (CEE, reference number 303) using a resource access table (Resource Access Table RAT, reference number 304) shown therein in FIG. 3, for example.

The processing of an MO:DCA AFP document data stream is presented in FIG. 4. The various processing steps show what an AFP application designer (user) has to do in order to create an application: The user generates a formdef file (resource) 23 that contains a copy group (medium map) with the name ACCOUNT by means of a formatting computer program 20 that, for example, can be the aforementioned Page Printer Formatting Aid (PPFA) Tool from the IBM corporation or the Smart Layout Editor (SLE) described in the "Druckerbuch" introduced above and by means of a control file 21a with corresponding formatting parameters.

A print data file 22 that contains variable data is prepared by the user such that it will call the copy group which was stored with the control file 21a with structured fields of the Invoke Medium Map (IMM) type "IMM Account" that stand between the variable data. Details regarding the structured field type IMM can be learned from the aforementioned IBM document SC31-6802-05.

Figure 5:
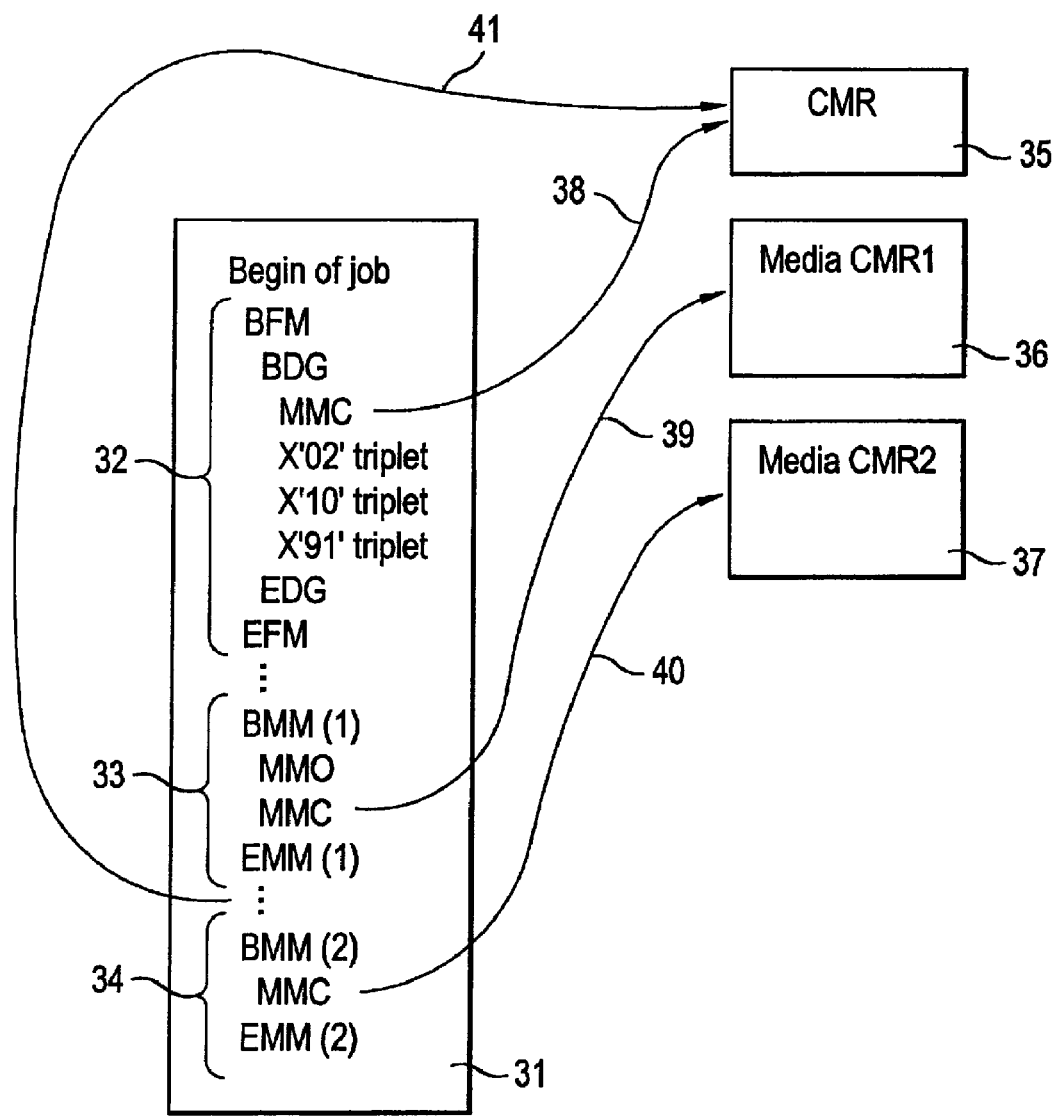
FIG. 5 shows the processing of a further MO:DCA data stream.

In the example shown in FIG. 5, the print data file contains account statement documents for two different customers of a bank. The document data contain on the one hand static form data and furthermore the page-specific, customer-specific data. For the first customer, the print data file 22 contains two account statements 28, 29 with 9 pages, printed out on 4 sheets or 6 pages printed out on 3 sheets. An account statement document 30 with 2 pages should be printed out for the second customer. For this the print data file 22 and the formdef file 23 are supplied to a printer driver 24 of a host computer or print server that, in Step S3, forms a print data stream of the IPDS format from the two files and possible additional resource files (such as fonts, for example), with which print data stream an IPDS-capable printing system 25 is controlled. In the shown example the printing system 25 is comprised of a first electrophotographic digital printer 26 in which the front side of a web-shaped recording medium is printed and an electrophotographic digital printer 27 in which the back side of the same recording medium is printed with the respective associated data. Both printers contain corresponding controllers to interpret the incoming data streams and electronic control elements such as, for example, an LED comb with associated electronics.

The aforementioned documents are printed out in Step S4, i.e. the first printout of the first customer as a first document 28 which comprises five individual sheets, three sheets for the first customer as a second document 29 with the second account statement, and two sheets for the second customer as a third document 30.

Upon each call of the media map (Invoke Media Map, IMM) "IMM ACCOUNT", in the course of the output of the data in the printing system the corresponding output medium is used or, respectively, changed relative to a previously used output medium (for example on yellow DIN A4 paper with 60 g/m$^2$). In addition, a color management resource that bears the name "Media CMR ACCOUNT" is associated (arrows 21c, 21d, 21e) with the data stream automatically or via a corresponding structured field, which color management resource is incorporated into an object container (arrow 21f) in the generation of the IPDS data stream in the printer driver 24.

Shown in FIG. 5 is an MO:DCA document data stream 31 in which in a formdef region 32 that is bounded by the map objects BFM (Begin Form Map) and EFM (End Form Map) and in which a color management resource 25 valid for the entire document data stream 31 or print job is referenced (arrow 38) (i.e. applies in the uppermost hierarchy level of the data stream) by a Medium Modification Control field (MMC). In further regions 33, 34 of the data stream 31 that are respectively associated with a lower hierarchy level (namely a group of pages), recording media are associated with these pages using media map objects. In the data stream 31 the regions 33, 34 are respectively bounded by the map objects BMM (Begin Media Map) and EMM (End Media Map). A color management resource 36 corresponding to the color attributes of the divider sheets (for example their light blue color) and their remaining attributes (weight, for example 60 g/m$^2$; material, for example paper etc.) is thereby associated (arrow 39) with the region 33 that, for example, can be associated with divider sheets provided in the printing device. A color management resource 37 corresponding to the finish attribute (foil layer) of the sheets is thereby associated (arrow 40) with the region 34 that, for example, can be associated with foil-coated sheets to be printed that are provided in the printing device. Upon being processed, document pages that lie between the calls of the regions 33, 34 in the data stream 31, i.e. in particular after the end of the region 33, are automatically associated with the color management resource of the superordinate region (in the shown example the region of the entire print job) and therefore with the color management resource 35, and are processed in the printing device with the data of this color management resource.

The data stream 31 can possess additional resources and/or resource calls according to the MO:DCA specification. The data of the data stream can in particular comprise the corresponding data in the aforementioned US-A1-2005/0248787 and be generated and/or processed with the methods shown in this disclosure. This disclosure is incorporated again at this point of the specification for this purpose.

The concrete extension suggestions (in particular those specified in the exemplary embodiments) for the existing data stream specifications regarding AFP, MO:DCA and IPDS, such as (for example) the referencing indicated further above of a color management resource via a Medium Modification Control (MMC) field, are to be understood only as non-binding examples; the basic concepts of the preferred embodiment can naturally also be achieved in these data streams via other concrete extension provisions.

Depending on the requirements, media attributes such as brightness, weight, color and finish can be determined according to various standards, for example according to a standard of the Printer Working Group (PWG), in particular the Internet Printing Protocol (IPP) or also the Universal Printer, Pre- and Postprocessing (UP$^3$I).

The preferred embodiment is in particular suited to be realized as a computer program (software). It can therefore be distributed as a computer program module as a file on a data medium such as a diskette, DVD or CD-ROM, or as a file via a data or communication network. Such and comparable computer program products or computer program elements are embodiments of the preferred embodiment. The workflow according to the invention can be applied in a computer, in a printing device or in a printing system with upstream or downstream data processing devices. It is thereby clear that corresponding computers at which the preferred embodiment is applied can contain additional, known technical devices such as input devices (keyboard, mouse, touchscreen), a microprocessor, a data or control bus, a display device (monitor, display) as well as a working memory, a hard drive storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method to generate or process a resource-based document data stream with which an output of at least one document on an output medium can be controlled, comprising the steps of:
   providing the document data stream with resource reference data related to at least one color management resource, and medium reference data related to the output medium; and
   logically connecting the resource reference data and the medium reference data with one another such that when the medium reference data changes because the output medium has changed, then the resource reference data is automatically changed to another color management resource.

2. A method according to claim 1 wherein the color management resource contains data adapted to properties of the output medium for processing of color-related data of document data streams and for output of the document data on the output medium.

3. A method according to claim 2 wherein the output medium is a recording medium and recording medium data regarding its at least one of color, brightness, weight or finish property are provided in the color management resource.

4. A method according to claim 1 wherein the logical connection of the resource reference data and the recording medium reference data is retained within the document data stream that comprises data regarding at least one of multiple documents, within document pages, or within document page ranges.

5. A method according to claim 1 wherein the logical connection of the resource reference data and the recording medium reference data is variable within a document data stream for at least one of different documents, within document pages, or within document page ranges.

6. A method according to claim 1 wherein the logical connection occurs via referencing the color management resource within a data element associated with the recording medium.

7. Previously Presented) A method according to claim 1 wherein a logical connection of attributes related to at least one of color management resources, page-related attributes, or media-related attributes occurs hierarchically within the document data stream according to document regions, and an adjustment, related to a color management resource, of a value of a superordinate hierarchy level occurs when a hierarchy level is ended.

8. A method according to claim 7 wherein successive document pages are processed with same logically connected media attributes until new media attributes can be assigned.

9. A method according to claim 7 wherein, if at least one media attribute but no color attribute is assigned to a region of the document data stream, the color attributes valid for a superordinate region are logically connected with this region.

10. A method according to claim 7 wherein hierarchy levels of the document data stream which are provided are at least one of "print file", "document", "page group" or "data object".

11. A method according to claim 1 wherein values regarding media properties are stored encoded in a color management resource.

12. A method according to claim 11 wherein in an output device it is checked upon output of the documents whether an output medium available in said output device and corresponding to the media reference data corresponds to media properties stored in the color management resource; and in the event of lack of correlation, it is checked hierarchy level by hierarchy level whether a color management resource better corresponding to the media properties of the output medium is available, and if possible this is used to process the associated document data.

13. A method according to claim 1 wherein files of color management resources are provided with names from which emerge at least one attribute of a media associated with them.

14. A method according to claim 1 wherein an identifier for differentiation of a front side and a back side is provided for document pages that are to be output double-sided on a recording medium, and via the identifier a different color management resource is associated with the front side than with the back side.

15. A method according to claim 1 wherein the document data stream is structured according to at least one of the AFP, MO:DCA or IPDS specification.

16. A method according to claim 15 wherein the logical connecting of the color management resource with a structure element associated with a Medium Map occurs.

17. A method according to claim 15 wherein the logical connecting occurs by means of a structured field.

18. A method according to claim 17 wherein the logical connecting occurs via a Map Data Resource.

19. A method according to claim 15 wherein the logical connecting occurs via an identification marker of the color management resource.

20. A method according to claim 15 wherein the document data stream comprises additional resource associations conforming to specification.

21. A method according to claim 1 wherein a recording medium which is page-shaped is used.

22. A method according to claim 1 wherein at least one index is associated with the document data stream by use of which indexed color management resource color-related data of the document data stream can be associated with at least one predetermined color palette.

23. A method according to claim 22 wherein the indexed color management resource contains encoded information logically connected with a number of process color palettes available in the indexed color management resource.

24. A method according to claim 22 wherein the indexed color management resource contains one item of encoded information per process color palette that specifies which color tones available in at least one of output system or defined in a color system in a color system are required to reproduce process colors of a respective process color palette.

25. A method according to claim 24 wherein the encoded information is associated with at least one of a plain text name of a color tone or a color tone number of a predetermined color definition.

26. A method according to claim 22 wherein at least one of the indexed color management resource, its associated data of the document data stream contains per process color palette, an item of encoded information about the process colors contained in the document data generation process, document data processing process, or in the output device.

27. A method according to claim 22 wherein the indexed color management resource contains encoded information that indicates which second color palette data of the document data stream are re-logically connected when they cannot be reproduced on an output device with the original association with a first color palette.

28. A method according to claim 22 wherein the document data stream is structured according to at least one of the AFP, MO:DCA, or IPDS specification.

29. A method according to claim 22 wherein the document data stream is output from a print server to a printing device, and processing steps of the color association are implemented at least in part in at least one of a print server or a printing device.

30. A method according to claim 22 wherein in the processing of the document data stream it is checked whether at least one of a color or a color palette referenced in the data stream by means of an index code and defined in the color management resource are available in the output device, which check occurs before the output.

31. A method according to claim 1 wherein data that relate to color management resources are provided as job chaperone data in a file that is separate from a rest of the document data stream.

32. A method according to claim 31 wherein at least one of the job chaperone data, their file, or additional job chaperone data are structured according to a specification of Job Definition Format.

33. A device for generation or processing of a resource-based document data stream, comprising:
a control system with which an output of at least one document on an output medium can be controlled, the document data stream containing resource data related to at least one color management resource, and medium reference data related to the output medium, and wherein the resource reference data and the medium reference data are logically connected with one another such that when the medium reference data changes because the output medium has changed, then the resource reference data is automatically changed to another color management resource.

34. A device according to claim 33 wherein the control system comprises a computer.

35. A device according to claim 33 wherein the control system is part of a printing device.

36. A non-transitory computer-readable medium comprising a computer program to generate or process a resource-based document data stream with which an output of the at least one document on an output medium can be controlled, said program performing the steps of:
providing the document data stream with resource reference data related to at least one color management resource, and medium reference data related to the output medium; and
logically connecting the resource reference data and the medium reference data with one another such that when the medium reference data changes because the output medium has changed, then the resource reference data is automatically changed to another color management resource.

* * * * *